United States Patent
Nicholl et al.

(10) Patent No.: US 12,510,378 B2
(45) Date of Patent: Dec. 30, 2025

(54) MULTI-TURN MAGNETIC SENSOR MID-RANGE RESET

(71) Applicant: Analog Devices International Unlimited Company, County Limerick (IE)

(72) Inventors: Enda Joseph Nicholl, Kilmallock (IE); Dara Lorcan O'Sullivan, Enniskeane (IE)

(73) Assignee: Analog Devices International Unlimited Company, County Limerick (IE)

( * ) Notice: Subject to any disclaimer, the term of this patent is extended or adjusted under 35 U.S.C. 154(b) by 225 days.

(21) Appl. No.: 18/362,768

(22) Filed: Jul. 31, 2023

(65) Prior Publication Data
US 2025/0044124 A1    Feb. 6, 2025

(51) Int. Cl.
*G01D 5/14*    (2006.01)

(52) U.S. Cl.
CPC ......... *G01D 5/145* (2013.01); *G01D 2205/26* (2021.05); *G01D 2205/85* (2021.05)

(58) Field of Classification Search
CPC . G01D 5/145; G01D 2205/85; G01D 2205/26
See application file for complete search history.

(56) References Cited

U.S. PATENT DOCUMENTS

| | | | |
|---|---|---|---|
| 10,670,386 B2 * | 6/2020 | Zimmer | G01R 35/00 |
| 10,724,844 B2 | 7/2020 | Zimmer et al. | |
| 10,782,153 B2 | 9/2020 | Schmitt | |
| 10,830,613 B2 | 11/2020 | Tonge et al. | |
| 10,859,404 B2 * | 12/2020 | Diegel | G01D 5/16 |
| 10,859,406 B2 | 12/2020 | Richard et al. | |
| 11,448,528 B2 | 9/2022 | Cosgrave | |
| 11,460,521 B2 | 10/2022 | Schmitt et al. | |
| 11,519,751 B2 | 12/2022 | Schmitt et al. | |

(Continued)

FOREIGN PATENT DOCUMENTS

| | | |
|---|---|---|
| DE | 102011075306 A1 | 11/2012 |
| JP | 2019-500627 A | 1/2019 |

(Continued)

OTHER PUBLICATIONS

Notice of Reasons for Refusal issued in Japanese Application No. 2024-124720, dated Jun. 3, 2025.

*Primary Examiner* — Walter L Lindsay, Jr.
*Assistant Examiner* — Milton Gonzalez
(74) *Attorney, Agent, or Firm* — Knobbe, Martens, Olson & Bear, LLP

(57) ABSTRACT

Aspects of this disclosure relate to multi-turn magnetic sensing systems and related methods. A system can include a first multi-turn magnetic sensor and a second multi-turn magnetic sensor, in which domain walls propagate in an opposite direction in the second multi-turn magnetic sensor relative to the first multi-turn magnetic sensor in response to a magnetic field. A decoder can output a turn count that is based on states of the first and second multi-turn sensors. The first and second multi-turn sensors can have a reset state that corresponds to the turn count having a value between minimum and maximum values of a counting range relative to the reset state.

20 Claims, 11 Drawing Sheets

(56) References Cited

U.S. PATENT DOCUMENTS

| | | | |
|---|---|---|---|
| 11,614,341 | B2 | 3/2023 | Schmitt et al. |
| 2008/0054886 | A1 | 3/2008 | Uemura et al. |
| 2018/0172477 | A1 | 6/2018 | Dietrich et al. |
| 2018/0372510 | A1 | 12/2018 | Mattheis et al. |
| 2019/0242764 | A1 | 8/2019 | Nicholl et al. |
| 2019/0383645 | A1 | 12/2019 | Tonge et al. |
| 2020/0309566 | A1 | 10/2020 | Fujita et al. |
| 2021/0293902 | A1 | 9/2021 | Makino et al. |
| 2021/0364270 | A1 | 11/2021 | Schrubbe |
| 2022/0075010 | A1 | 3/2022 | Meehan et al. |
| 2025/0044125 | A1 | 2/2025 | Nicholl et al. |

FOREIGN PATENT DOCUMENTS

| | | |
|---|---|---|
| JP | 2019-502134 A | 1/2019 |
| JP | 2019-219392 A | 12/2019 |

\* cited by examiner

| State | Spiral 1 | Spiral 2 | Index | Action | Turn Count |
|---|---|---|---|---|---|
| Initialization | 10 | 10 | 0 | Reset | 0 |
| 1 Rotation CW | 10 | 9 | 1 | Index | 1 |
| 2 Rotation CW | 10 | 8 | 1 | | 2 |
| 3 Rotation CW | 10 | 7 | 1 | | 3 |
| 4 Rotation CW | 10 | 6 | 1 | | 4 |
| 5 Rotation CW | 10 | 5 | 1 | | 5 |
| 6 Rotation CW | 10 | 4 | 1 | | 6 |
| 7 Rotation CW | 10 | 3 | 1 | | 7 |
| 8 Rotation CW | 10 | 2 | 1 | | 8 |
| 9 Rotation CW | 10 | 1 | 1 | | 9 |
| 10 Rotation CW | 10 | 10 | 1 | Reset | 10 |
| 11 Rotation CW | 10 | 9 | 2 | Index | 11 |
| 12 Rotation CW | 10 | 8 | 2 | | 12 |
| 13 Rotation CW | 10 | 7 | 2 | | 13 |
| 14 Rotation CW | 10 | 6 | 2 | | 14 |
| 15 Rotation CW | 10 | 5 | 2 | | 15 |
| 16 Rotation CW | 10 | 4 | 2 | | 16 |
| 17 Rotation CW | 10 | 3 | 2 | | 17 |
| 18 Rotation CW | 10 | 2 | 2 | | 18 |
| 19 Rotation CW | 10 | 1 | 2 | | 19 |
| 20 Rotation CW | 10 | 10 | 2 | Reset | 20 |
| 21 Rotation CW | 10 | 9 | 3 | Index | 21 |
| 22 Rotation CW | 10 | 8 | 3 | | 22 |
| 23 Rotation CW | 10 | 7 | 3 | | 23 |
| 24 Rotation CW | 10 | 6 | 3 | | 24 |
| 25 Rotation CW | 10 | 5 | 3 | | 25 |
| 26 Rotation CW | 10 | 4 | 3 | | 26 |
| 27 Rotation CW | 10 | 3 | 3 | Direction change | 27 |
| 1 Rotation CCW | 9 | 4 | 3 | | 26 |
| 2 Rotation CCW | 8 | 5 | 3 | | 25 |
| 3 Rotation CCW | 7 | 6 | 3 | | 24 |
| 4 Rotation CCW | 6 | 7 | 3 | | 23 |
| 5 Rotation CCW | 5 | 8 | 3 | | 22 |
| 6 Rotation CCW | 4 | 9 | 3 | | 21 |
| 7 Rotation CCW | 10 | 10 | 3 | Reset | 20 |
| 8 Rotation CCW | 9 | 10 | 2 | Index | 19 |
| 9 Rotation CCW | 8 | 10 | 2 | | 18 |
| 10 Rotation CCW | 7 | 10 | 2 | | 17 |
| 11 Rotation CCW | 6 | 10 | 2 | | 16 |
| 12 Rotation CCW | 5 | 10 | 2 | | 15 |
| 13 Rotation CCW | 4 | 10 | 2 | | 14 |
| 14 Rotation CCW | 3 | 10 | 2 | | 13 |
| 15 Rotation CCW | 2 | 10 | 2 | | 12 |

FIG. 5B-1

| State | Spiral 1 | Spiral 2 | Index | Action | Turn Count |
|---|---|---|---|---|---|
| 16 Rotation CCW | 1 | 10 | 2 | | 11 |
| 17 Rotation CCW | 10 | 10 | 2 | Reset | 10 |
| 18 Rotation CCW | 9 | 10 | 1 | Index | 9 |
| 19 Rotation CCW | 8 | 10 | 1 | | 8 |
| 20 Rotation CCW | 7 | 10 | 1 | | 7 |
| 21 Rotation CCW | 6 | 10 | 1 | | 6 |
| 22 Rotation CCW | 5 | 10 | 1 | | 5 |
| 23 Rotation CCW | 4 | 10 | 1 | | 4 |
| 24 Rotation CCW | 3 | 10 | 1 | | 3 |
| 25 Rotation CCW | 2 | 10 | 1 | | 2 |
| 26 Rotation CCW | 1 | 10 | 1 | | 1 |
| 27 Rotation CCW | 10 | 10 | 0 | Reset | 0 |
| 28 Rotation CCW | 9 | 10 | -1 | Index | -1 |
| 29 Rotation CCW | 8 | 10 | -1 | | -2 |
| 30 Rotation CCW | 7 | 10 | -1 | | -3 |
| 31 Rotation CCW | 6 | 10 | -1 | | -4 |
| 32 Rotation CCW | 5 | 10 | -1 | | -5 |
| 33 Rotation CCW | 4 | 10 | -1 | | -6 |
| 34 Rotation CCW | 3 | 10 | -1 | | -7 |
| 35 Rotation CCW | 2 | 10 | -1 | | -8 |
| 36 Rotation CCW | 1 | 10 | -1 | | -9 |
| 37 Rotation CCW | 10 | 10 | -1 | Reset | -10 |
| 38 Rotation CCW | 9 | 10 | -2 | Index | -11 |
| 39 Rotation CCW | 8 | 10 | -2 | | -12 |
| 40 Rotation CCW | 7 | 10 | -2 | | -13 |
| 41 Rotation CCW | 6 | 10 | -2 | | -14 |
| 42 Rotation CCW | 5 | 10 | -2 | | -15 |
| 43 Rotation CCW | 4 | 10 | -2 | | -16 |
| 44 Rotation CCW | 3 | 10 | -2 | | -17 |
| 45 Rotation CCW | 2 | 10 | -2 | | -18 |
| 46 Rotation CCW | 1 | 10 | -2 | | -19 |
| 47 Rotation CCW | 10 | 10 | -2 | Reset | -20 |
| 48 Rotation CCW | 9 | 10 | -3 | Index | -21 |
| 49 Rotation CCW | 8 | 10 | -3 | | -22 |
| 50 Rotation CCW | 7 | 10 | -3 | Direction change | -23 |
| 1 Rotation CW | 8 | 9 | -3 | | -22 |
| 2 Rotation CW | 9 | 8 | -3 | | -21 |
| 3 Rotation CW | 10 | 10 | -3 | Reset | -20 |
| 4 Rotation CW | 10 | 9 | -2 | Index | -19 |
| 5 Rotation CW | 10 | 8 | -2 | | -18 |
| 6 Rotation CW | 10 | 7 | -2 | | -17 |
| 7 Rotation CW | 10 | 6 | -2 | | -16 |
| 8 Rotation CW | 10 | 5 | -2 | | -15 |

FIG. 5B-2

| State | Spiral 1 | Spiral 2 | Index | Action | Turn Count |
|---|---|---|---|---|---|
| 9 Rotation CW | 10 | 4 | -2 | | -14 |
| 10 Rotation CW | 10 | 3 | -2 | | -13 |
| 11 Rotation CW | 10 | 2 | -2 | | -12 |
| 12 Rotation CW | 10 | 1 | -2 | | -11 |
| 13 Rotation CW | 10 | 10 | -2 | Reset | -10 |
| 14 Rotation CW | 10 | 9 | -1 | Index | -9 |
| 15 Rotation CW | 10 | 8 | -1 | | -8 |
| 16 Rotation CW | 10 | 7 | -1 | | -7 |
| 17 Rotation CW | 10 | 6 | -1 | | -6 |
| 18 Rotation CW | 10 | 5 | -1 | | -5 |
| 19 Rotation CW | 10 | 4 | -1 | | -4 |
| 20 Rotation CW | 10 | 3 | -1 | | -3 |
| 21 Rotation CW | 10 | 2 | -1 | | -2 |
| 22 Rotation CW | 10 | 1 | -1 | | -1 |
| 23 Rotation CW | 10 | 10 | -1 | Reset | 0 |

FIG. 5B-3

MULTI-TURN MAGNETIC SENSOR MID-RANGE RESET

BACKGROUND

Technical Field

The disclosed technology relates to multi-turn magnetic sensors and related systems and methods.

Description of Related Technology

A magnetic sensing system can include a multi-turn magnetic sensor that counts a cumulative number of rotations of a magnetic field. A multi-turn magnetic sensor can include magnetoresistive elements that are arranged in series with each other as a spiral shaped strip. Resistance of one or more of the magnetoresistive elements can change in response to rotation of a magnetic field. The state of the multi-turn magnetic sensor can be decoded from output signals of the multi-turn magnetic sensor.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a multi-turn magnetic sensing system that includes a first multi-turn magnetic sensor, a second multi-turn magnetic sensor, and a decoder configured to output a turn count that is based on output signals from the first multi-turn sensor and the second multi-turn sensor. In the multi-turn magnetic sensing system, domain walls propagate in an opposite direction in the second multi-turn magnetic sensor relative to the first multi-turn magnetic sensor in response to a magnetic field.

The decoder can determine the turn count in a range from a first value to a second value for states of the first and second multi-turn sensors relative to a reset state, in which the turn count for the reset state is between the first value and the second value. The first multi-turn sensor and the second multi-turn second can each count a same number of turns in opposite directions, and the turn count for the reset state can be a midpoint between the first value and the second value. The first multi-turn sensor and the second multi-turn second can each be filled with domain walls in the reset state.

The decoder can determine the turn count for more than one full clockwise rotation of the magnetic field from a reset state and determine the turn count for more than one full counterclockwise rotation of the magnetic field from the reset state.

The multi-turn magnetic sensing system can include a magnetic reset configured to magnetically reset the first and second multi-turn magnetic sensors to a reset state. The decoder can determine the turn count in a range from a first value to a second value relative to the reset state. The turn count for the reset state can be between the first value and the second value. In certain embodiments, the magnetic reset can include a coil configured to apply a reset magnetic field to reset the first and second multi-turn magnetic sensors to the reset state. The multi-turn magnetic sensing system can include memory to store an index value. The multi-turn magnetic sensing system can update the index value in association with magnetically resetting the first and second multi-turn magnetic sensors. The decoder can generate the turn count based on the index value and the output signals from the first multi-turn sensor and the second multi-turn sensor.

The multi-turn sensing system can operate in a subset of valid states of the first and second multi-turn magnetic sensors when operating in equilibrium.

The first and second multi-turn sensors can have a state that corresponds to a same number of turns as the reset state, and the first and second multi-turn sensors may not be configured to move from the state to the reset state by rotation of the magnetic field.

The turn count can have a same value for at least two different of states of the first and second multi-turn sensors.

The multi-turn magnetic sensing system can include an angle sensor and processing circuitry configured to output a position measurement. The position measurement can be based on the turn count and an angle, where the angle is based on an output signal of the angle sensor.

Another aspect of this disclosure is a multi-turn magnetic sensing system with mid-range reset. The multi-turn magnetic sensing system includes a first multi-turn magnetic sensor, a second multi-turn magnetic sensor, and a decoder configured to output a turn count associated with states of the first multi-turn sensor and the second multi-turn sensor. Domain walls propagate in opposite directions in the second multi-turn magnetic sensor and the first multi-turn magnetic sensor in response to a magnetic field. The turn count is in a range from a minimum value to a maximum value relative to a reset state. The turn count for the reset state is between the first value and the second value.

The multi-turn magnetic sensing system can include a magnetic reset configured to magnetically reset the first and second multi-turn magnetic sensors to the reset state.

Another aspect of this disclosure is a method of multi-turn magnetic sensing with mid-range reset. The method includes resetting a first multi-turn sensor and a second multi-turn sensor to a reset state, wherein domain walls propagate in opposite directions in the first multi-turn sensor and the second multi-turn sensor in response to rotation of a magnetic field; detecting a first non-zero number of turns of the magnetic field from the reset state based on reading out first values from the first multi-turn sensor and the second multi-turn sensor, the first non-zero number of turns representing that a cumulative rotation of the magnetic field is in a clockwise direction from the reset state; and detecting a second non-zero number of turns of the magnetic field relative to the reset state based on reading out second values from the first multi-turn sensor and the second multi-turn sensor, the second non-zero number of turns representing that the cumulative rotation of the magnetic field is in a counterclockwise direction from the reset state.

The method can include generating a position measurement based on the turn count and angle information.

The first multi-turn sensor and the second multi turn second can each include magnetic spirals having a same number of turns.

The first multi-turn sensor and the second multi turn second can each be filled with domain walls in the reset state.

The method can include magnetically resetting the first multi-turn sensor in response to the magnetic field rotating a certain number of turns; updating an index value stored in memory in association with the magnetically resetting; and after the updating and additional rotation of the magnetic field, determining a turn count based on the index value and reading out third values from the first multi turn sensor and the second multi-turn sensor.

The method can include generating a position measurement based on the turn count and angle information associated with the magnetic field.

Another aspect of this disclosure is a method of multi-turn magnetic sensing with rollover counting. The method includes resetting a multi-turn magnetic sensor to a reset state, wherein the multi-turn magnetic sensor comprises a magnetic spiral having N turns, and wherein N is a positive integer greater than 1; updating an index value in association with the resetting; and determining a turn count based on output signals from the multi-turn magnetic sensor and the index value, wherein the turn count has a value having a magnitude that is greater than N.

The resetting can include applying a reset magnetic field to the multi-turn magnetic sensor using a coil. The resetting can include causing a permanent magnet to move in proximity to the multi-turn magnetic sensor.

Determining the turn count can also be based on output signals from a second multi-turn magnetic sensor, in which domain walls propagate in an opposite direction in the second multi-turn magnetic sensor compared to the multi-turn magnetic sensor. The method can include after additional rotation of the magnetic field following the determining, generating a turn count having a second value, wherein the value represents clockwise rotations from an initialization state, and wherein the second value represents counterclockwise rotations from the initialization state. The multi-turn sensor and the second multi-turn sensor can each be filled with domain walls in the reset state.

The turn count can have a quarter turn resolution.

The method can include processing an output signal from an angle sensor to generate angle information; and generating a position measurement based on the turn count and the angle information.

Another aspect of this disclosure is a multi-turn magnetic sensing system with rollover counting. The multi-turn magnetic sensing system includes a multi-turn magnetic sensor and processing circuitry. The multi-turn magnetic sensor includes a magnetic spiral with N turns, where N is a positive integer greater than 1. The processing circuitry includes memory configured to store an index value and a decoder configured to determine a turn count with a value having a magnitude that is greater than N based on output signals from the multi-turn magnetic sensor and the index value. The turn count represents a number of rotations of a magnetic field.

The multi-turn magnetic sensing system can include a magnetic reset configured to magnetically reset the magnetic spiral. The magnetic reset comprises a coil configured to apply a reset magnetic field to magnetically reset the magnetic spiral in response to a control signal from the processing circuitry. The processing circuitry can update the index value in association with magnetically resetting the magnetic spiral. The processing circuitry can update the index value in response to detecting rotation of the magnetic field after magnetically resetting the magnetic spiral.

The multi-turn magnetic sensing system can include a second multi-turn magnetic sensor that includes a second magnetic spiral. Domain walls can propagate in opposite directions in the magnetic spiral and the second magnetic spiral. The decoder can determine the turn count based on the output signals from the multi-turn magnetic sensor, output signals from the second multi-turn magnetic sensor, and the index value. The second magnetic spiral can have N turns. The processing circuitry can detect a change in rotation direction of the magnetic field. The decoder can determine the turn count with a second value having a magnitude that is greater than N, where the value represents clockwise rotations from an initialization state, and where the second value represents counterclockwise rotations from the initialization state.

The multi-turn magnetic sensing system can include an angle sensor. The processing circuitry can output a position measurement based on the turn count and angle information from the angle sensor.

Another aspect of this disclosure is a multi-turn magnetic sensing system with rollover counting. The multi-turn magnetic sensing system includes a first multi-turn magnetic sensor, a second multi-turn magnetic sensor, and a decoder configured to output a turn count based on an index value and states of the first multi-turn sensor and the second multi-turn sensor. The first multi-turn magnetic sensor includes a first magnetic spiral with N turns, where N is a positive integer greater than 1. Domain walls propagate in opposite directions in the second multi-turn magnetic sensor and the first multi-turn magnetic sensor in response to a magnetic field. The decoder is configured to determine the turn count for more than N full clockwise rotations of the magnetic field from an initialization state and to determine the turn count for more than N full counterclockwise rotations of the magnetic field from the initialization state.

The multi-turn magnetic sensing system can include a magnetic reset configured to magnetically reset the first multi-turn magnetic sensor to a reset state. The multi-turn magnetic sensing system can include processing circuitry configured to update the index value in association with magnetically resetting the first multi-turn magnetic sensor.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will be described, by way of non-limiting example, with reference to the accompanying drawings.

FIGS. 5B-1, 5B-2, and 5B-3 are a table summarizing sensor states, index value, and turn count for the multi-turn magnetic sensing system of FIG. 5A as a magnetic field rotates, the multi-turn magnetic sensors are reset, and an index value is updated.

DETAILED DESCRIPTION OF CERTAIN EMBODIMENTS

Figure 1B:
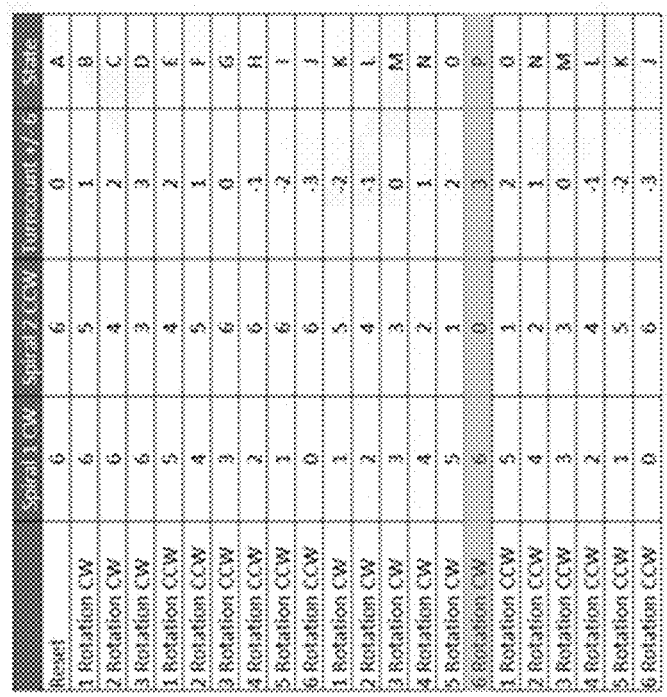
FIG. 1B is a table summarizing state and turn count for the multi-turn magnetic sensing system of FIG. 1A as a magnetic field rotates.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the illustrated elements. Further, some embodiments can incorporate any suitable combination of features from two or more drawings. The headings are provided for convenience only and do not impact the scope or meaning of the claims.

Multi-Turn Magnetic Sensors

Multi-turn magnetic sensors can continuously detect rotary or linear motion in the absence of power and absolute position can be read back on power-on. Multi-turn magnetic sensors can provide true power-on capabilities without receiving power. Multi-turn magnetic sensors can operate on the principle of a magnetic spiral or track detecting motion in the presence of a moving permanent magnet. The magnetic spiral can include nanowires. The magnetic spiral can comprise giant magnetoresistive (GMR) material. The resistance of magnetoresisitve elements of the magnetic spiral can change as the magnetic spiral fills with domain walls, which can also be referred to as magnetic domains, in response to rotation of a magnetic field. This effect can be referred to as form anisotropy. A turn count can be decoded from resistances of magnetoresistive elements of the multi-turn magnetic sensor. The turn count can be combined with an angle detected by an angle sensor to provide absolute multi-turn position information.

A technical challenge with multi-turn magnetic sensors is initializing and/or resetting the multi-turn magnetic sensor at mid-position of the measurement range. This disclosure provides technical solutions to this challenge.

Another technical challenge associated with multi-turn magnetic sensors is that a number of turns that the multi-turn sensor count can be limited by a number of turns of a magnetic spiral of a multi-turn magnetic sensor. In a variety of applications, it can be desirable for the multi-turn magnetic sensor to continue counting beyond a turn count limit that is based on physical geometry of a magnetic spiral. This disclosure provides technical solutions related to counting turns of a magnetic field beyond a limit that can be imposed by the physical geometry of a magnetic spiral of a multi-turn magnetic sensor.

Resetting Multi-Turn Magnetic Sensors

A multi-turn magnetic sensor can be reset by applying a magnetic field having a magnitude that is higher than an upper operating magnetic limit of the multi-turn magnetic sensor. This can result in a magnetic spiral of a multi-turn magnetic sensor filling with domain walls. Such a reset can correspond to the multi-turn magnetic sensor being in a maximum turn count state. In some other applications, resetting a magnetic spiral of a multi-turn magnetic sensor can result in the multi-turn magnetic sensor being in a minimum turn count state with a magnetic spiral that is empty of domain walls.

The magnetic spiral can take the form of a clockwise (CW) sensor or a counterclockwise (CCW) sensor. A CW multi-turn magnetic sensor can count turns in the presence of a magnetic field rotating in CW direction. In such a multi-turn magnetic sensor, the turn count can correspond to magnetoresistive elements of a magnetic spiral being filled with domain walls. The magnetoresistive elements can be legs of the magnetic spiral. A CCW multi-turn magnetic sensor can count turns in the presence of a magnetic field rotating in CCW direction. Domain walls propagate in an opposite direction in a CW multi-turn magnetic sensor relative to a CCW multi-turn magnetic sensor.

If a CW sensor is magnetically reset by being filled with domain walls, then the CW sensor can be at a state corresponding to a maximum turn count. From the state corresponding to the maximum turn count, the CW sensor can only detect multiturn motion in the presence of a magnetic field that is rotating in the CCW direction. Likewise, after a CCW sensor is magnetically reset to a state where it is filled with domain walls, the CCW sensor can only detect multi-turn motion in the presence of a magnetic field rotating in the CW direction.

Mid-Position Reset of Multi-turn Magnetic Sensors

Aspects of this disclosure relate to resetting multi-turn magnetic sensors to a reset state that corresponds to a turn count that is between a first value and a second value of a turn count range corresponding to states of two multi-turn magnetic sensors. The first value can be a minimum value of a turn count range, and the second value can be a maximum value of the turn count range. Accordingly, a multi-turn magnetic sensing system can track CW rotation of a magnetic field from the reset state and track CCW rotation of the magnetic field from the reset state.

A multi-turn magnetic sensing system can include two multi-turn magnetic sensors, one CW multi-turn magnetic sensor and one CCW multi-turn magnetic sensor. Domain walls can propagate in opposite directions in the CW multi-turn sensor and the CCW multi-turn magnetic sensor. Both the CW multi-turn magnetic sensor and the CCW multi-turn magnetic sensor can be reset in an initialization phase to a reset state. The reset state can correspond to both of the multi-turn magnetic sensors being filled with domain walls.

From the reset state, the multi-turn magnetic sensing system can count a cumulative number of turns in the CW direction and/or in the CCW direction. If the magnetic field rotates in the CW direction from the reset state, then the CCW sensor counts down from N to 0, where N is the maximum number of turns. At the same time, the CW sensor can remain at its maximum N turn state. Similarly, if the magnetic field rotates in the CCW direction from the reset state, then the CW sensor can count down from N to 0, where N is the maximum number of turns. At the same time, the CCW sensor can remain in its maximum N turn state.

Figure 1A:
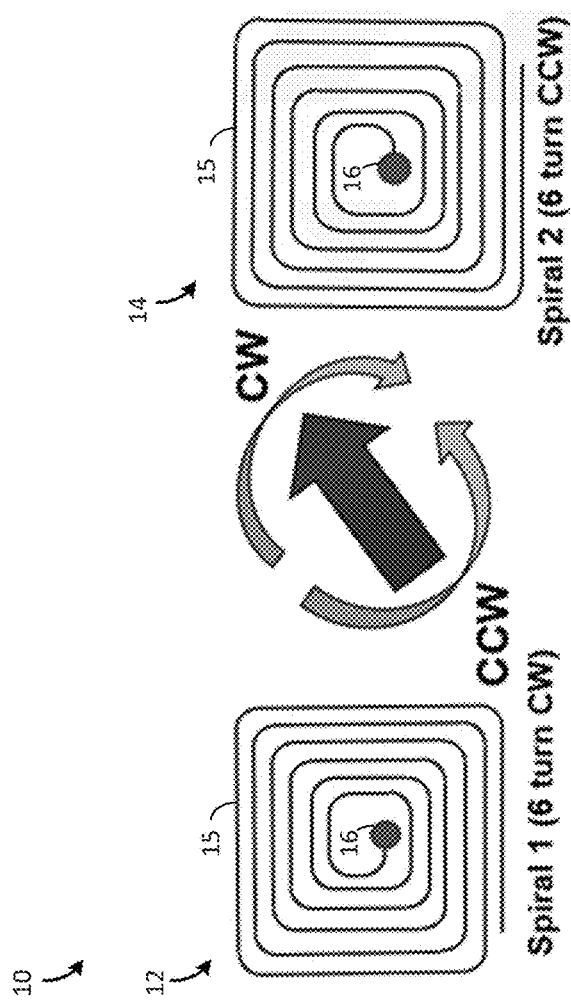
FIG. 1A is a schematic diagram of two multi-turn sensors of a multi-turn magnetic sensing system according to an embodiment.

FIG. 1A is a schematic diagram of two multi-turn sensors of a multi-turn magnetic sensing system according to an embodiment. FIG. 1B is a table summarizing state and turn count for the multi-turn magnetic sensing system of FIG. 1A as a magnetic field rotates. FIG. 1A illustrates a multi-turn magnetic sensing system 10 with a CW sensor and a CCW sensor with magnetic reset capability is capable of measuring +/−N turns of a rotating magnetic field with mid-range magnetic reset.

Referring to FIG. 1A, the multi-turn magnetic sensing system 10 includes a first magnetic spiral 12 and a second magnetic spiral 14. The magnetic spirals 12 and 14 each implement a respective multi-turn magnetic sensor. The magnetic spirals 12 and 14 each include a plurality of magnetoresistive elements 15 that are arranged in series with each other. Each side of the magnetic spiral 12, 14 between consecutive corners of the magnetic spiral 12, 14 includes a magnetoresistive element 15. The magnetic spirals 12 and 14 each include 6 turns and 24 magnetoresistive elements 15. The magnetic spirals 12 and 14 can each include a domain wall generator 16 at an end of the spiral. In certain applications, the first magnetic spiral 12 and the second magnetic spiral 14 can be on a single die. Alternatively, the first magnetic spiral 12 and the second magnetic spiral 14 can be on different die.

The multi-turn magnetic sensing system 10 can count +/−3 turns of a magnetic field from a reset state. The reset state can correspond to a turn count that is between endpoints of the count range. For example, in the multi-turn magnetic sensing system 10, the reset state can correspond to a midpoint of the count range. For a +/−3 count range, the first magnetic spiral 12 and the second magnetic spiral 14 can each have a 6-turn measurement range. For example, as illustrated in FIG. 1A, the first magnetic spiral 12 can count 6 turns of a magnetic field in the CW direction and the second magnetic spiral 14 can count 6 turns of the magnetic field in the CCW direction. In the multi-turn magnetic sensing system 10, the reset state can correspond to the midpoint of the turn count range. This can be due to the first magnetic spiral 12 and the second magnetic spiral 14 having the same number of turns.

In this disclosure, the CW turns are indicated as positive turns and CCW turns are indicated as negative turns. The opposite convention where CCW turns are positive turns and CW turns are negative turns can be used to describe the same functionality.

Operation of the multi-turn magnetic sensing system 10 will be discussed with reference to FIG. 1B. The first magnetic spiral 12 and the second magnetic spiral 14 can be reset. This can fill each of the magnetic spirals 12, 14 with domain walls. In the reset state, the first magnetic spiral 12 and the second magnetic spiral 14 can both be at a maximum state, which is 6 in this example. The turn count of the multi-turn magnetic sensing system 10 can represent the cumulative number of turns from the reset state. Accordingly, for the reset state, the turn count is 0. This state can be system state A of the multi-turn magnetic sensing system 10.

As the magnetic field rotates CW for 3 full turns, the turn count of the second magnetic spiral 14 can decrease and the state of the first magnetic spiral 12 can remain the same. The turn count of the multi-turn magnetic sensing system 10 can increase by 1 for each full CW rotation of the magnetic field. The states of the multi-turn magnetic sensing system 10 after 1 full CW rotation from the reset state, 1 full CW rotations from the reset state, and 3 full CW rotations from the reset state are B, C, and D, respectively, in FIG. 1B.

As the magnetic field rotates CW for 3 full turns, the turn count of the second magnetic spiral 14 can decrease and the turn count of the first magnetic spiral 12 can remain the same. The turn count of the multi-turn magnetic sensing system 10 can increase by 1 for each full CW rotation of the magnetic field. The states of the multi-turn magnetic sensing system 10 after 1 full CW rotation from the reset state, 1 full CW rotations from the reset state, and 3 full CW rotations from the reset state are B, C, and D, respectively, in FIG. 1B.

From system state D, the magnetic field can rotate 3 full CCW turns. The turn count of the first magnetic spiral 12 can decrease and the turn count of the second magnetic spiral 14 can increase. The turn count of the multi-turn magnetic sensing system 10 can decrease by 1 for each full CCW rotation of the magnetic field. The states of the multi-turn magnetic sensing system 10 after these full CCW magnetic field rotations from system state D are E, F, and G, respectively. At state G of the system, the system turn count is back to 0 after 3 CW and 3 CCW rotations from the reset state.

The magnetic field can rotate CW for 3 more full turns, where first magnetic spiral 12 can decrease and the turn count of the second magnetic spiral 14 can increase.

After a magnetic field cumulatively rotates 3 turns in each direction from the reset state, the multi-turn magnetic sensing system 10 can operate in equilibrium. The first system state K and subsequent states of FIG. 1B correspond to the multi-turn magnetic sensing system 10 operating in equilibrium. Once equilibrium is reached, the multi-turn magnetic sensing system 10 operates in one of 7 system states for full turns of the magnetic field, where these system states correspond to full turn counts of −3 to +3. These 7 system states are states J, K, L, M, N, O, and P in FIG. 1B. A preconditioning circuit and a decoder can be used to decode valid pre-equilibrium states to turn counts. In FIG. 1B, states A, B, C, D, E, F, G, H, and I are valid pre-equilibrium states from which turn count of the system can be decoded.

As indicated by FIG. 1B, the multi-turn magnetic sensing system 10 can have more than one system state that corresponds to the same turn count. For instance, there can be a pre-equilibrium state and an equilibrium state that both correspond to the same turn count. As one example, system states H and L both correspond to a turn count of −1. As another example, system states B, F, and N each correspond to a turn count of 1. This example illustrates that more than one pre-equilibrium state can correspond to the same turn count as one equilibrium state.

In FIG. 1B, 16 system states (i.e., states A to P) corresponding to full turns from the reset state are shown. Other valid states are possible for the multi-turn magnetic sensing system 10. The other valid states can be pre-equilibrium states. As one example of another valid state, 1 CCW rotation from the reset state is another possible valid state.

Operation of the multi-turn magnetic sensing system 10 is discussed above with reference to full rotations of a magnetic field. The multi-turn magnetic sensing system 10 can track turns with a different resolution in accordance with any suitable principles and advantages disclosed herein. For example, a decoder can determine a turn count from output signals associated with the first magnetic spiral 12 and/or the second magnetic spiral 14 with a half turn resolution or quarter turn resolution. With a half turn resolution, there are can an intermediate state between any two consecutive states associated with full turns in which the intermediate state can correspond to a half turn between the two consecutive full turn states. With a quarter turn resolution, there are can 3 intermediate states between any two consecutive states associated with full turns where the intermediate states can correspond to a quarter turn, a half turn, and three quarters of a turn.

Any suitable principles and advantages disclosed with reference to FIGS. 1A and/or 1B can be applied to a multi-turn magnetic sensing system that can count +/−N turns, where a CW sensor and a CCW sensor each individually have a measurement range of 2N turns. With rollover counting and indexing, any suitable principles and advantages disclosed with reference to FIGS. 1A and/or 1B can be applied to a multi-turn magnetic sensing system with rollover counting where the turn count can have a value with a magnitude that is greater than the number of turns of an individual multi-turn magnetic sensor.

Although the magnetic spirals 12 and 14 are configured to count the same number of turns as each other, any suitable principles and advantages disclosed with reference to FIGS. 1A and/or 1B can be applied to two magnetic spirals that can count a different number of turns. For two magnetic spirals that can count a different number of turns, the reset state may not be in the exact midpoint of the system turn count range.

Multi-Turn Magnetic Sensing Systems with Mid-Position Reset

Mid-position reset can be implemented in various multi-turn magnetic sensing systems. Such multi-turn magnetic sensing systems can include additional hardware than shown in FIG. 1A. For example, multi-turn magnetic systems can include processing circuitry and a magnetic reset. The processing circuitry can include a signal conditioning circuit and a controller. In certain applications, multi-turn magnetic systems can include one or more additional sensors, such as an angle sensor and/or a quadrant detector. Example multi-turn magnetic sensing systems with mid-position reset will be discussed with reference to FIGS. 2 to 4.

Figure 2:
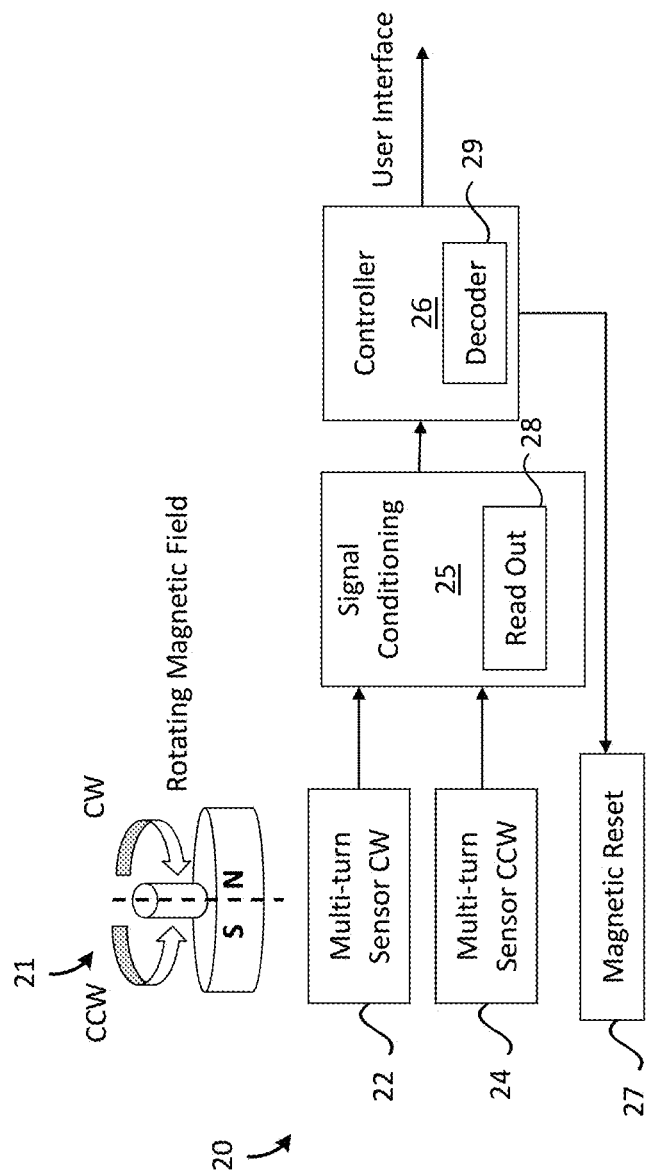
FIG. 2 is a schematic block diagram of a multi-turn magnetic sensing system with mid-position reset according to an embodiment.

FIG. 2 is a schematic block diagram of a multi-turn magnetic sensing system 20 according to an embodiment. The multi-turn magnetic sensing system 20 can track and output a turn count representing a number of turns of a magnetic field that can be generated by rotation of a magnetic target 21 or other magnetic field source. As illustrated, the magnetic target 21 can be a dipole magnet. The magnetic target 21 can be mounted to a rotating shaft in certain applications. The multi-turn magnetic sensing system 20 includes a first multi-turn magnetic sensor 22, a second multi-turn magnetic sensor 24, a signal conditioning circuit 25, a controller 26, and a magnetic reset 27.

The first multi-turn magnetic sensor 22 is a CW sensor. The second multi-turn magnetic sensor 24 is a CCW sensor. The multi-turn magnetic sensors 22 and 24 can each include a magnetic spiral. Example magnetic spirals are shown in FIG. 1A. The multi-turn magnetic sensors 22 and 24 can include magnetic spirals configured to track any suitable number of turns for a particular application.

Output signals from the first multi-turn magnetic sensor 22 and the second multi-turn magnetic sensor 24 are conditioned by the signal conditioning circuit 25. The signal conditioning circuit 25 can include any suitable circuitry to modify raw analog output signals from the multi-turn magnetic sensors 22 and 24 to make the signals suitable for further processing. The signal conditioning circuit 25 can include one or more amplifiers and/or one or more filters, for example. The signal conditioning circuit 25 can include a read out circuit 28 that reads out values associated with magnetoresistive elements of the multi-turn magnetic sensors 22 and 24. In certain applications, the read out circuit 28 can be implemented in accordance with any suitable principles and advantages disclosed in U.S. Pat. No. 10,782,153, the disclosure of which is hereby incorporated by reference in its entirety and for all purposes. A signal generated by the read out circuit 28 can be indicative of resistance of one or more of magnetoresistive elements of the first multi-turn magnetic sensor 22 or the second multi-turn magnetic sensor 24.

The controller 26 can include a decoder 29 that can determine a cumulative turn count of the magnetic field from output signals from the signal conditioning circuit 25. The controller 26 can digitize an output signal from the signal conditioning circuit 25 with an analog-to-digital converter (ADC). A digital output signal from the ADC can be provided to the decoder 29 for determining the turn count. The controller 26 can output the turn count to a user interface, for example. The user interface can be any suitable interface, including but not limited to an inter-integrated circuit (I²C) interface or a serial peripheral interface (SPI). The controller 26 can generate a control signal to control the magnetic reset 27.

The decoder 29 can output a turn count that represents a cumulative number of turns of a magnetic field. The decoder 29 can determine any suitable values from Table 1B, for example. For instance, the decoder 29 can determine states of the multi-turn magnetic sensors 22 and 24 and turn count. The decoder 29 can determine a state of the first multi-turn magnetic sensor 22 and the second multi-turn magnetic sensor 24 based on the output signals from the read out circuit 28. The state of the of the first multi-turn magnetic sensor 22 can be determined based on signals representing resistances of magnetoresistive elements of the first multi-turn magnetic sensor 22. Similarly, the state of the of the second multi-turn magnetic sensor 24 can be determined based on signals representing resistances of magnetoresistive elements of the first multi-turn magnetic sensor 24. The decoder 29 can receive digital input signals and provide the turn count as a digital output signal. In certain applications, the decoder 29 can implement successive approximation decoding to determine the state of an individual multi-turn magnetic sensor 22 or 24. Such decoding can be implemented in accordance with any suitable principles and advantages disclosed in U.S. Pat. No. 10,830,613, the disclosure of which is hereby incorporated by reference in its entirety and for all purposes.

The decoder 29 can determine the turn count from the states of the multi-turn magnetic sensors 22 and 24. An example mapping of turn count to sensor states is provided in FIG. 1B. In decoding output signals from the read out circuit 28, the decoder 29 can decode valid pre-equilibrium states and valid equilibrium states. The decoder 29 can be a full turn decoder, a half turn decoder, or a quarter turn decoder.

The controller 26 can control the magnetic reset 27 to reset the multi-turn magnetic sensors 22 and 24 to a reset state. Such a magnetic reset can be performed upon system initialization. In such instances, the reset state can be an initialization state. In some applications, magnetic reset can be performed in response to one or more of detecting a system fault, for rollover counting which is discussed in more detail below, periodically, after reaching a threshold amount of time for system operation, or in response to detecting any other suitable condition.

The magnetic reset 27 can include any suitable structure to reset the multi-turn magnetic sensors 22 and 24. In certain applications, the magnetic reset 27 can include a coil that can generate a reset magnetic field that is greater than an upper operating limit of the multi-turn magnetic sensors 22 and 24. The controller 26 can cause current to flow through the coil to generate the reset magnetic field. The coil can fill the multi-turn magnetic sensors 22 and 24 with domain walls to bring the multi-turn magnetic sensors 22 and 24 to the reset state. The coil can be implemented on a printed circuit board. In some other applications, the magnetic reset 27 can include a permanent magnetic that is brought into physical proximity to the multi-turn magnetic sensors 22 and 24 to apply a magnetic field that is greater than an upper operating limit of the multi-turn magnetic sensors 22 and 24. For such a permanent magnet, the controller 26 can provide a control signal to cause the permanent magnet to move sufficiently close to the multi-turn magnetic sensors 22 and 24 to bring them to the reset state. Then the controller 26 can cause the permanent magnet to move away from the multi-turn magnetic sensors 22 and 24 to allow the multi-turn magnetic sensing system 20 to track rotation of a magnetic field.

Figure 3:
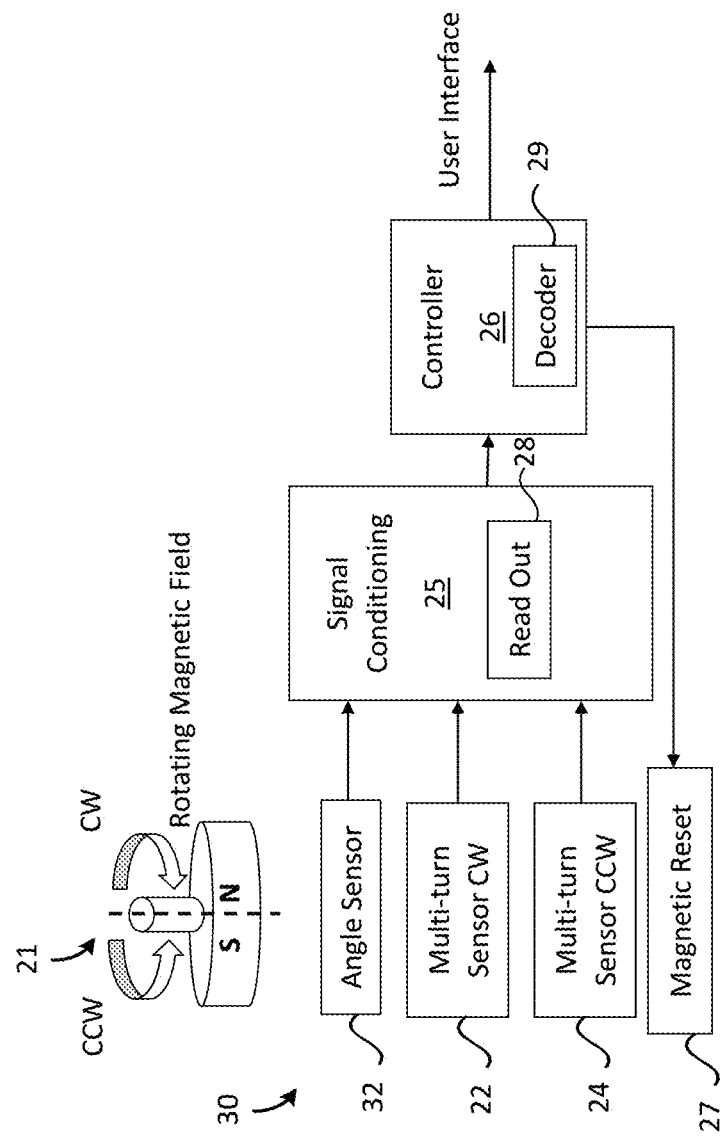
FIG. 3 is a schematic block diagram of a multi-turn magnetic sensing system that also includes angle sensing according to an embodiment.

FIG. 3 is a schematic block diagram of a multi-turn magnetic sensing system 30 that includes an angle sensor 32 according to an embodiment. The multi-turn magnetic sensing system 30 is like the multi-turn magnetic sensing system 20 of FIG. 2, except that the multi-turn magnetic sensing system 30 also includes the angle sensor 32 and the processing circuitry of the multi-turn magnetic sensing system 30 can combine angle and turn count to generate a position measurement.

The angle sensor 32 can detect a magnetic angle associated with the magnetic field. The angle sensor 32 can be a magnetic sensor, such as, but not limited to, an anisotropic magnetoresistive (AMR) sensor or another type of magnetoresistive sensor. As one example, the angle sensor 32 can include two half bridges of magnetoresistive elements. An angle can be determined from the angle sensor 32. For example, the signal conditioning circuit 25 can condition an output signal from the angle sensor 32 and the controller 26 can determine the angle from the conditioned output signal from the angle sensor 32. The angle can be in a range from 0° to 360°. The angle can be determined with any suitable precision, such as within 1° of accuracy, within 0.5° of accuracy, or within 0.250 of accuracy.

The controller 26 can combine the turn count and the angle to generate a position measurement. The position measurement can represent a number of turns and an angle of magnetic field rotation from the reset state. For example, when the turn count is two turns and the angle is 14°, the position measurement can be 734°. The position measurement has a finer resolution than the turn count. In certain applications, the position measurement can have an accuracy of ±0.25°.

The processing circuitry (for example, circuitry of the controller 26) of the multi-turn magnetic sensing system 30 can compensate for a phase shift between signals associated with an angle sensor and a multi-turn sensor, for example, in accordance with any suitable principles and advantages disclosed in U.S. Pat. No. 10,859,406, the disclosure of which is hereby incorporated by reference in its entirety and for all purposes.

Figure 4:
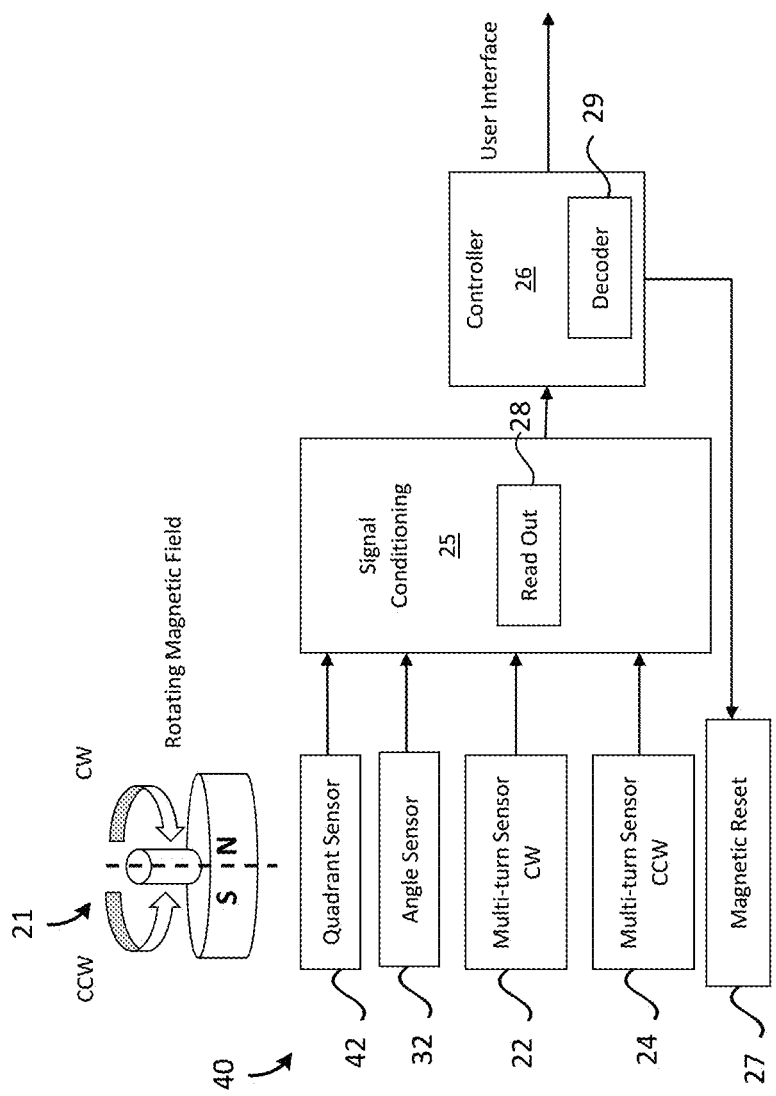
FIG. 4 is a schematic block diagram of a multi-turn magnetic sensing system that also includes quadrant detection according to an embodiment.

FIG. 4 is a schematic block diagram of a multi-turn magnetic sensing system 30 that includes a quadrant detector 42 according to an embodiment. The multi-turn magnetic sensing system 40 is like the multi-turn magnetic sensing system 40 of FIG. 3, except that the multi-turn magnetic sensing system 40 also includes the quadrant detector 42 and the processing circuitry of the multi-turn magnetic sensing system 40 can combine quadrant information with turn count and/or angle information.

The quadrant detector 42 can detect a quadrant associated with the magnetic field. The angle sensor 42 can be a magnetic sensor, such as, but not limited to, an anisotropic magnetoresistive (AMR) sensor or another type of magnetoresistive sensor. The quadrant can be determined from the quadrant detector 42. For example, the controller 26 can determine the quadrant from an output signal from the quadrant detector 42 that is conditioned by the signal conditioning circuit 25. The controller 26 can use quadrant information to increase safety and/or redundancy. The controller 26 combine the quadrant with the turn count to generate a position measurement and/or to verify turn count and/or the position measurement. In some instances, a multi-turn magnetic sensing system can include multi-turn magnetic sensors 22 and 24 and a quadrant detector 42 and not include an angle sensor 32.

Multi-Turn Magnetic Sensing with Rollover Counting

Aspects of this disclosure relate to rollover counting beyond a turn count associated with a number of turns of a magnetic track of a multi-turn magnetic sensor. With rollover counting, a multi-turn magnetic sensor system can continuously count a number of rotations of a magnetic field beyond the turn count associated with the physical geometry of the multi-turn magnetic sensor(s) of the multi-turn magnetic sensing system. The turn count associated with the physical geometry can be referred to as sensor turn count. When a multi-turn magnetic sensor reaches a value at an end point of a sensor turn count range, the multi-turn magnetic sensor(s) of the system can be reset and an index value can be stored to memory of the system. In subsequent decoding of the turn count, the system can determine the turn count based on the state of multi-turn magnetic sensor(s) and the index value.

In certain embodiments, a multi-turn magnetic sensor comprises a magnetic spiral having N turns, where N is a positive integer greater than 1. An index value can be updated in association with resetting the multi-turn magnetic sensor. The turn count can be determined based on output signals from the multi-turn magnetic sensor and the index value, and the turn count can have a value having a magnitude that is greater than N. The turn count can also be determined based on output signals from a second multi-turn magnetic sensor, where domain walls propagate in an opposite direction in the second multi-turn magnetic sensor compared to the multi-turn magnetic sensor.

The ability to continue counting beyond a turn count associated with a physical geometry of a multi-turn magnetic sensor can be achieved by a system that includes two multi-turn magnetic sensors and a magnetic reset system, where the two multi-turn magnetic sensors include a CW sensor and a CCW sensor. Magnetic reset can be implemented in accordance with any suitable principles and advantages of magnetic resetting disclosed herein.

Both the CW sensor and the CCW sensors can be magnetically reset (e.g., filled with domain walls) at the initialization phase. If the magnetic field rotates in the CW direction from the reset state, then the CCW sensor can be active and count down from N to 0, where N is the maximum number of sensor turns and at the same time the CW sensor can remain in its maximum N turn static state. Similarly, if the magnetic field rotates in CCW direction from the reset state, then the CW sensor can be active and count down from N to 0, where N is the maximum number of sensor turns and at the same time the CCW sensor can remain in its max N turn static state.

Applying a magnetic reset whenever the active sensor reaches 0 turns can enable continuous counting. Following reset and, as rotation continues, the turn count can be indexed up or down as applicable when the active sensor state changes from N to N−1. The updated index value can be stored to memory.

A change in rotation direction can be detected as the static sensor set at N turns changes state. When the static sensor changes stage, the previously static sensor can start counting down from N to 0 and the previously active sensor can count in the opposite direction.

Following a change in direction, the magnetic reset can be applied in response to the previously active sensor reaching N turns. Following reset, the index value can be updated in the opposite direction when the newly active sensor its state changes from N to N−1. The newly active sensor can be reset when it reaches 0 turns.

Figure 5A:
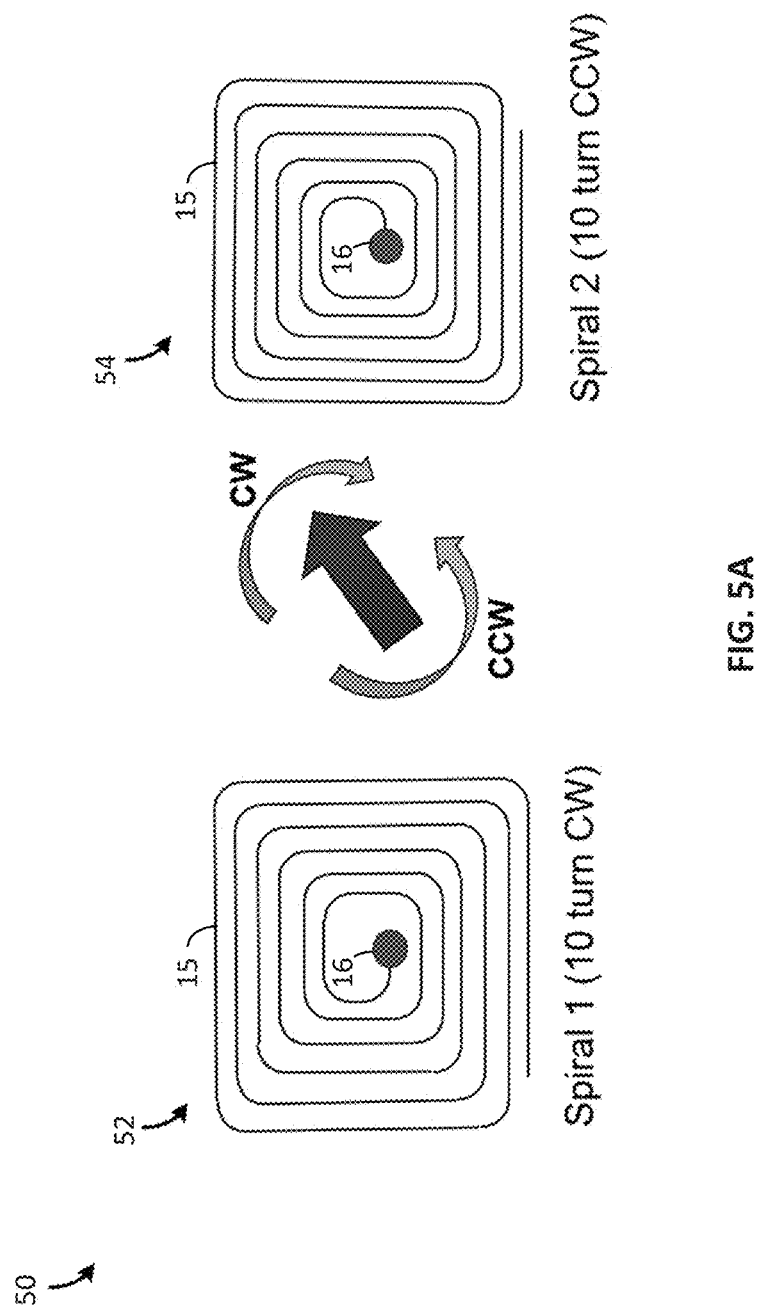
FIG. 5A is a schematic diagram of two multi-turn sensors of a multi-turn magnetic sensing system according to an embodiment.

FIG. 5A is a schematic diagram of two multi-turn sensors of a multi-turn magnetic sensing system according to an embodiment. FIGS. 5B-1, 5B-2, and 5B-3 are a table summarizing sensor states, index value, and turn count for the multi-turn magnetic sensing system of FIG. 5A as a magnetic field rotates, the multi-turn magnetic sensors are reset, and an index value is updated. FIG. 5A illustrates a multi-turn magnetic sensing system 50 with a 10 turn CW sensor and a 10 turn CCW sensor with magnetic reset capability and index tracking.

Referring to FIG. 5A, the multi-turn magnetic sensing system 50 includes a first magnetic spiral 52 and a second magnetic spiral 54. The magnetic spirals 52 and 54 each implement a multi-turn magnetic sensor. The magnetic spirals 52 and 54 each include a plurality of magnetoresistive elements 15 that are arranged in series with each other. Each side of the magnetic spiral 52, 54 between consecutive corners of the respective magnetic spiral 52, 54 includes a magnetoresistive element 15. The magnetic spirals 52 and 54 each include 10 turns and 40 magnetoresistive elements 15. Any suitable principles and advantages of rollover counting disclosed herein can be applied to magnetic spirals having any suitable number of turns. The magnetic spirals 52 and 54 can each include a domain wall generator 16 at an end of the spiral.

With magnetic reset and indexing, the multi-turn magnetic sensing system 50 can count rotations of a magnetic field both in the CW and CCW directions beyond the number of turns of an individual magnetic spiral 52, 54. For example, the Table of FIGS. 5B-1, 5B-2, and 5B-3 summarizes operation of the multi-turn magnetic sensing system 50 for various rotations of a magnetic field a range from −23 turns to 27 turns form an initial state. In this example, the multi-turn magnetic sensing system 50 can track the turn count with states of the magnetic spirals 52 and 54 and the index value. The index value is stored in memory of the multi-turn magnetic sensing system 50. The multi-turn magnetic sensing system 50 can count any suitable number of turns in the CW direction and any suitable number of turns in the CCW direction.

As discussed above, in this disclosure, the CW turns are indicated as positive turns and CCW turns are indicated as negative turns. The opposite convention where CCW turns are positive turns and CW turns are negative turns can be used to describe the same functionality.

Operation of the multi-turn magnetic sensing system 50 will be discussed with reference to FIGS. 5B-1, 5B-2, and 5B-3. The first magnetic spiral 52 and the second magnetic spiral 54 can be reset to an initialization state. This can fill each of the magnetic spirals 52, 54 with domain walls. In the initialization state, the first magnetic spiral 52 and the second magnetic spiral 54 can both be at a maximum state, which is 10 in this example. The turn count of the multi-turn magnetic sensing system 50 can represent the cumulative number of turns from the initialization state. For the initialization state, the turn count is 0. As shown in FIG. 5B-1, the initialization state corresponds to a turn count of 0. The initialization state also corresponds to an index of 0 in FIG. 5B-1. The index is updated in response to detecting rotation of the magnetic field from the initialization state. For instance, in this example, the index is incremented from 0 to 1 in response to detecting CW rotation of the magnetic field from the initialization state.

As the magnetic field rotates CW for 9 full turns, the turn count of the second magnetic spiral 54 can decrease and the state of the first magnetic spiral 52 can remain the same. The turn count of the multi-turn magnetic sensing system 50 can increase by 1 for each full CW rotation of the magnetic field. During this CW rotation, the second magnetic spiral 54 is active and the first magnetic spiral 52 is static.

The magnetic spiral 54 can be magnetically reset after a magnetic field rotates a full number of CW rotations corresponding to the number of turns of the second magnetic spiral 54. In the multi-turn magnetic sensing system 50, the second magnetic spiral 54 is reset after the magnetic field rotates 10 full turns CW from the reset state. The magnetic spirals 52 and 54 can be reset to a reset state. The reset state can be different than the initialization state due to the index value being non-zero. For example, in a reset state of FIG. 5B-1 that corresponds to 10 turns, the magnetic spirals 52 and 54 each have a state of 10 and the index value is 1. The reset state can be the same as the initialization state when the reset state corresponds to 0 turns. For example, a reset state of FIG. 5B-2 that corresponds to 0 turns is the same as the initialization state.

After reset, the second magnetic spiral 54 can continue to adjust its turn count and function as the active sensor as the magnetic field rotates in the CW direction. The index value can be adjusted in association with a magnetic reset. The index value can be updated before, during or after a magnetic reset to keep track of a number of turns associated with the magnetic reset. In certain applications, the index value can be adjusted after reset. For example, as shown in FIGS. 5B-1 and 5B-2, the index value can be updated corresponding to a full turn after reset. The index value can be updated corresponding to less than a full turn (e.g., a quarter turn, a half turn, three quarters of a turn, etc.) after reset in various applications. In some other implementations, the index value can be updated before or during the magnetic reset.

The multi-turn magnetic sensing system 50 can detect a change in rotation direction of the magnetic field. In response to a change in rotation direction of the magnetic field, the static sensor can change state and magnetic spirals 52 and 54 can count in opposite directions. For example, FIG. 5B-2 shows that the first spiral 52 can transition from a turn count of 10 to a turn count of 9 and the second spiral 54 can transition from a turn count of 3 to 4 for a full CCW rotation after a rotation direction change of the magnetic field. This illustrates that the previously static sensor can become active in association with a rotation direction change. When magnetic spirals 52 and 54 both have valid states that are different from their respective reset states, that can indicate that there has been a rotation direction change within half of a number of turns of the magnetic spirals 52 and 54.

As the magnetic field rotates CCW, the turn count of the first magnetic spiral 52 can decrease and the turn count of the second magnetic spiral 54 can increase. The magnetic spirals 52 and 54 can be reset in connection with the CCW rotation of the magnetic field causing a magnetic spiral 52 or 54 to reach an end point (e.g., 0 or 10 in FIGS. 5B-1 to 5B-3) turn count. For example, a magnetic reset can be performed in association with the second magnetic spiral 54 reaching a maximum turn count corresponding to the number of turns of the second magnetic spiral 54 in FIG. 5B-2. In some other applications where the magnetic field transitions from rotating CW to rotating CCW and the second spiral has a count that closer to the maximum count value than the minimum count value, the magnetic reset can be performed in association with the first magnetic spiral 52 reaching a minimum turn count.

The index can be updated in association with the magnetic reset. Where the magnetic field changes from rotating CW to CCW and then magnetic reset is performed, the index value can be decreased. The index value can be adjusted in opposite directions for magnetic reset associated with CW rotation and magnetic reset associated with CCW rotation.

As the magnetic field rotates CCW after reset, the turn count of the first magnetic spiral 52 can decrease and the state of the second magnetic spiral 54 can remain the same. The turn count of the multi-turn magnetic sensing system 50 can decrease by 1 for each full CCW rotation of the magnetic field. During this CCW rotation, the first magnetic spiral 52 is active and the second magnetic spiral 54 is static.

The magnetic spiral 54 can be magnetically reset after a magnetic field rotates a full number of CCW rotations corresponding to the number of turns of the first magnetic spiral 52. In the multi-turn magnetic sensing system 50, the first magnetic spiral 52 is reset after the magnetic field rotates 10 full CCW turns from a reset state. The magnetic spirals 52 and 54 can be reset to a reset state.

After reset, the first magnetic spiral 52 can continue to adjust its turn count and function as the active sensor as the magnetic field rotates in the CCW direction. The index value can be adjusted after reset. For example, as shown in FIGS. 5B-2 and 5B-3, the index value can be decreased in association with reset and CCW rotation.

The multi-turn magnetic sensing system 50 can continue to count a cumulative number of turns of a magnetic field in the CW and CCW directions by magnetically resetting and updating the index value. The turn count can be determined from the states of the magnetic spirals 52 and 54 and the index value. The multi-turn magnetic sensing system 50 can counting to count turns with any suitable number of magnetic field direction changes and any suitable number of magnetic resets.

As indicated by FIGS. 5B-1 to 5B-3, the multi-turn magnetic sensing system 50 can have more than one combination of states of magnetic tracks 52 and 54 and index value that corresponds to the same turn count. For instance, a turn count of 4 corresponds to both (a) the first magnetic spiral 52 having a turn count of 10, the second magnetic spiral 54 having a turn count of 6, and an index value of 1 and (b) the first magnetic spiral 52 having a turn count of 4, the second magnetic spiral 54 having a turn count of 10, and an index value of 1. As another example, a turn count of 23 corresponds to both (a) the first magnetic spiral 52 having a turn count of 10, the second magnetic spiral 54 having a turn count of 7, and an index value of 3 and (b) the first magnetic spiral 52 having a turn count of 6, the second magnetic spiral 54 having a turn count of 7, and an index value of 3.

In FIGS. 5B-1 to 5B-3, turn counts corresponding to full turns from the initialization state are shown. Other valid states are possible for the multi-turn magnetic sensing system 50. The other valid states can include states associated with rotation direction changes at different turn counts. The other valid states can correspond to turn counts with values outside of the range of the table of FIGS. 5B-1 to 5B-3.

Operation of the multi-turn magnetic sensing system 50 is discussed above with reference to full rotations of a magnetic field. The multi-turn magnetic sensing system 50 can track turns with a different resolution in accordance with any suitable principles and advantages disclosed herein. For example, a decoder can determine a turn count from output signals associated with the first magnetic spiral 52 and/or the second magnetic spiral 54 with a half turn resolution or quarter turn resolution. With a half turn resolution, there are can an intermediate state between any two consecutive states associated with full turns in which the intermediate state can correspond to a half turn between the two consecutive full turn states. With a quarter turn resolution, there are can 3 intermediate states between any two consecutive states associated with full turns where the intermediate states can correspond to a quarter turn, a half turn, and three quarters of a turn.

Any suitable principles and advantages disclosed with reference to FIGS. 5A and/or 5B-1 to 5B-3 can be applied to a multi-turn magnetic sensing system that includes magnetic spirals with any suitable number of turns for multi-turn magnetic sensing.

Although the magnetic spirals 52 and 54 have the same number of turns as each other, any suitable principles and advantages disclosed with reference to FIGS. 5A and/or 5B-1 to 5B-3 can be applied to two magnetic spirals with a different number of turns than each other.

Figure 6:
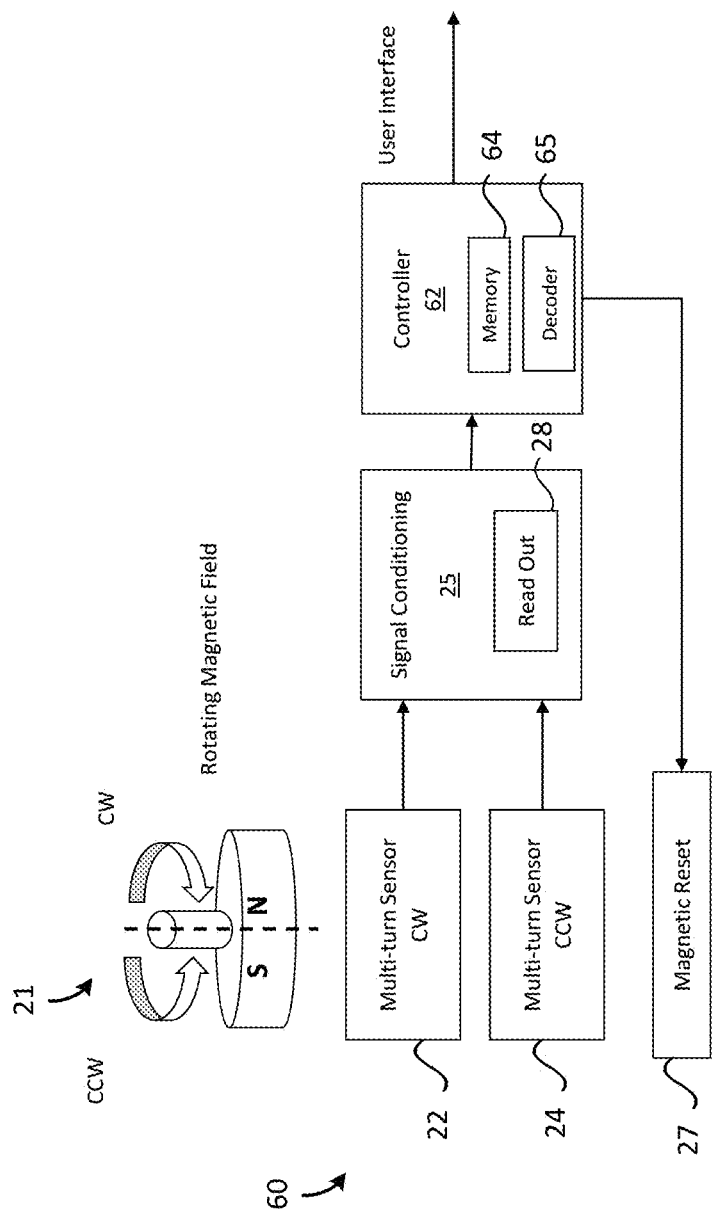
FIG. 6 is a schematic block diagram of a multi-turn magnetic sensing system with rollover counting according to an embodiment.

FIG. 6 is a schematic block diagram of a multi-turn magnetic sensing system 60 according to an embodiment. The multi-turn magnetic sensing system 60 can implement indexing and rollover counting. This can enable the multi-turn magnetic sensing system 60 to count more rotations of a magnetic field in the CW direction and the CCW direction than a number of turns of a multi-turn sensor 22 or 24.

In the multi-turn magnetic sensing system 60, the first multi-turn magnetic sensor 22 is a CW sensor and the second multi-turn magnetic sensor 24 is a CCW sensor. The signal conditioning circuit 25 can condition signals from the first and second multi-turn sensors 22 and 24. The multi-turn magnetic sensing system 60 includes a controller 62 that can adjust and store an index value in memory 64 for rollover counting. The index value can be updated in association with a maximum or minimum turn count is reached for one of the multi-turn magnetic sensors 22, 24 due to rotation of the magnetic field. The controller 62 can control the magnetic reset to magnetically reset the multi-turn magnetic sensors 22 and/or 24 in response to the maximum or minimum turn count being reached for one of the multi-turn magnetic sensors 22, 24 due to rotation of the magnetic field. The multi-turn magnetic sensing system 60 can count endlessly in either the CW or the CCW direction.

The multi-turn magnetic sensing system 60 is like the multi-turn magnetic sensing system 20 of FIG. 2, except that multi-turn magnetic sensing system 60 includes a controller 62 with an index value stored in memory 64 and a decoder 65 that uses to index value to decode turn count. The memory 64 can include any suitable non-transitory memory to store the index value. The controller 62 can include a counter to update the index value.

The decoder 65 can decode the turn count based on signals from the first and second multi-turn magnetic sensors 22 and 24 and the index value stored in the memory 64. The decoder 65 can output a turn count that represents a cumulative number of turns of a magnetic field. The decoder 65 can determine the turn count in accordance with any suitable principles and advantages discussed with reference to FIGS.

5A to 5B-3. One example mapping of turn count for sensor states and index value is provided in FIGS. 5B-1 to 5B-3.

The controller 65 can control the magnetic reset 27 to magnetically reset the first multi-turn magnetic sensor 22 to a reset state in response to detecting that rotation of the magnetic field caused the first multi-turn magnetic sensor 22 to reach an endpoint value, such as a maximum turn count or a minimum turn count of the first multi-turn magnetic sensor 22. In certain instances, the magnetic reset 27 can magnetically reset the second multi-turn magnetic sensor 24 while magnetically resetting the first multi-turn magnetic sensor 22. The controller 65 can control the magnetic reset 27 to magnetically reset the second multi-turn magnetic sensor 24 to a reset state in response to detecting that rotation of the magnetic field caused the second multi-turn magnetic sensor 24 to reach an endpoint value, such as a maximum turn count or a minimum turn count of the second multi-turn magnetic sensor 24. In certain instances, the magnetic reset 27 can magnetically reset the first multi-turn magnetic sensor 22 while magnetically resetting the second multi-turn magnetic sensor 24.

Figure 7:
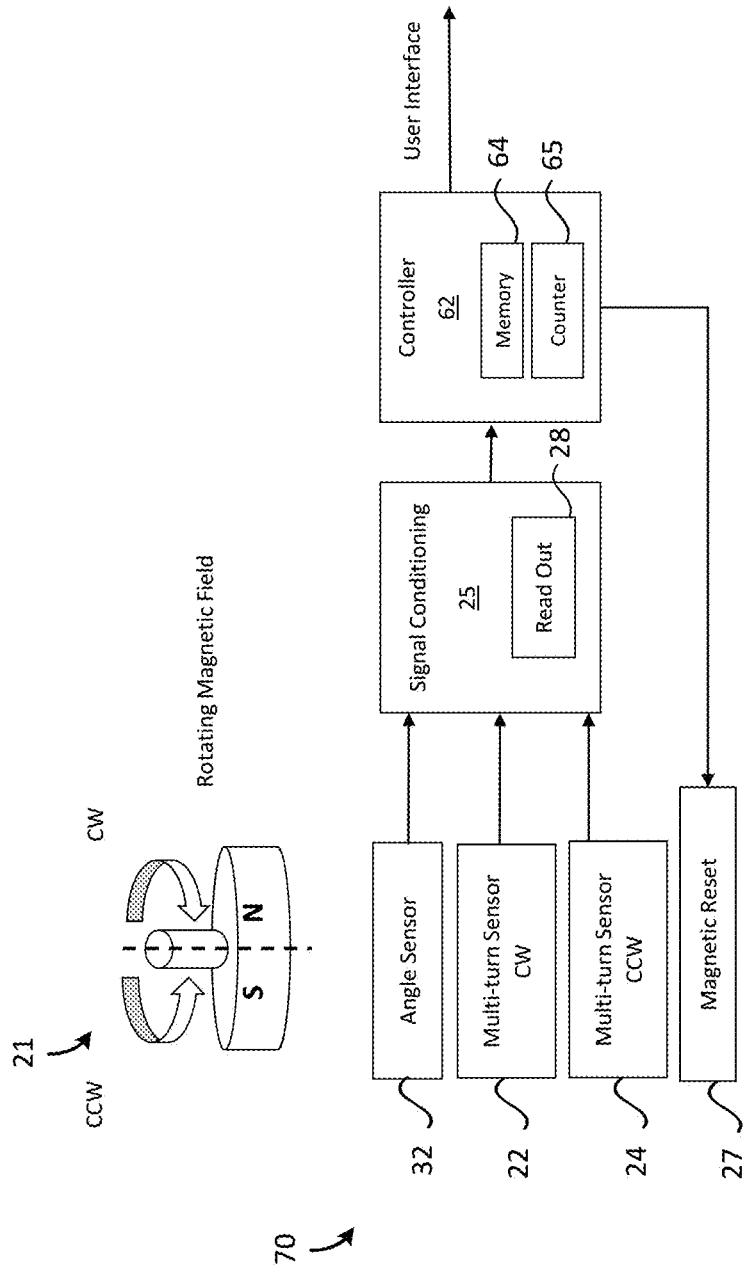
FIG. 7 is a schematic block diagram of a multi-turn magnetic sensing system with rollover counting and angle sensing according to an embodiment.

FIG. 7 is a schematic block diagram of a multi-turn magnetic sensing system 70 that includes an angle sensor 32 according to an embodiment. The multi-turn magnetic sensing system 70 is like the multi-turn magnetic sensing system 60 of FIG. 6, except that the multi-turn magnetic sensing system 70 also includes the angle sensor 32 and the processing circuitry of the multi-turn magnetic sensing system 70 can combine angle and turn count to generate a position measurement. The angle sensor 32 can be implemented in accordance with any suitable principles and advantages discussed with reference to FIG. 3.

A quadrant detector can implemented with a multi-turn magnetic sensing system with rollover counting in accordance with any suitable principles and advantages discussed with references to FIGS. 6 and/or 7.

Although certain embodiments with rollover counting in both the CW and CCW directions are disclosed, any suitable principles and advantages of rollover counting and indexing disclosed herein can be applied to a multi-turn magnetic sensing system arranged to unidirectional count turns from an initialization state. Such a magnetic sensing system can count cumulative turns of a magnetic field in either a CW direction or a CCW direction.

Figure 8:
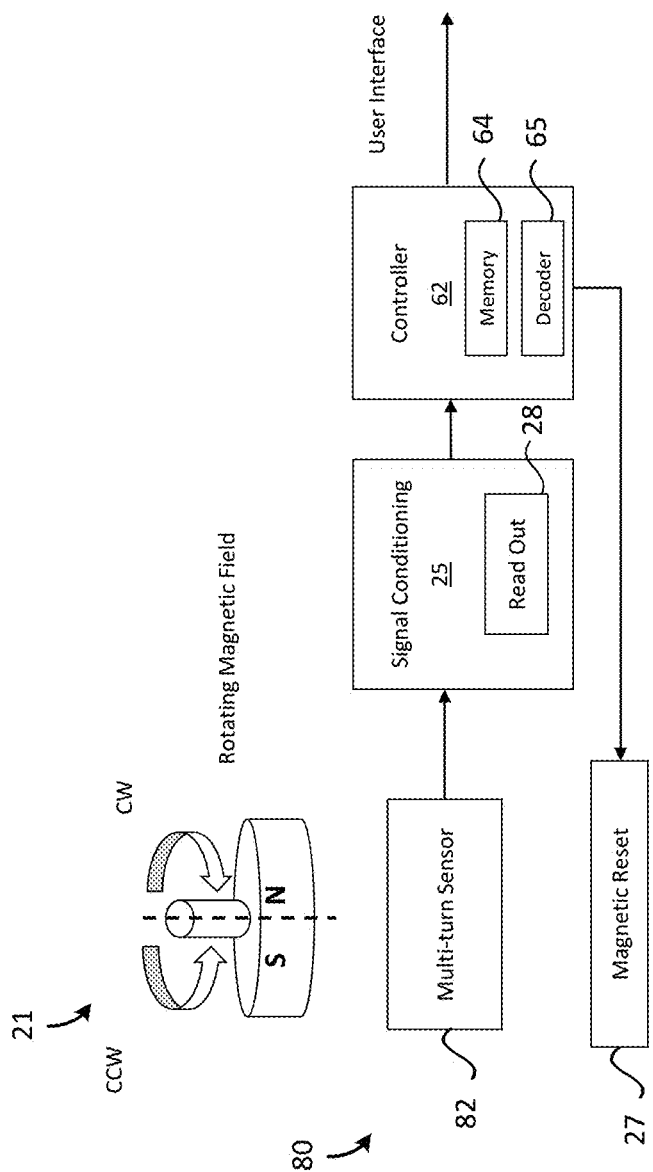
FIG. 8 is a schematic block diagram of a multi-turn magnetic sensing system with rollover counting and a single multi-turn magnetic sensor an embodiment.

FIG. 8 is a schematic block diagram of a multi-turn magnetic sensing system 80 with rollover counting and a single multi-turn magnetic sensor 82 an embodiment. The multi-turn magnetic sensing system 80 is like the multi-turn magnetic sensing system 60 of FIG. 6, except that the multi-turn magnetic sensing system 80 includes a single multi-turn magnetic sensor 82. The multi-turn magnetic sensing system 80 can cumulative count turns of a magnetic field from an initialization state in either the CW or the CCW direction depending on whether the multi-turn magnetic sensor 82 is a CCW sensor like the second multi-turn magnetic sensor 24 or a CW sensor like the first multi-turn magnetic sensor 22 and the initialization state. The controller 62 can update an index value stored in memory 64 and the decoder 65 can decode the turn count in accordance with any suitable principles and advantages discussed with reference to FIGS. 5A to 7 as applied to counting cumulative turns of the magnetic field in either the CW or CCW direction.

In some other applications, a single multi-turn magnetic sensor can be used for rollover counting in both the CW and CCW directions. In response to reaching a state where the single multi-turn magnetic sensor is empty of domain walls due to rotation of a magnetic field in a first direction, the single multi-turn magnetic sensor can be magnetically reset to be full of domain walls and an index value can be updated accordingly. In response to reaching a state where the single multi-turn magnetic sensor is full of domain walls due to rotation of the magnetic field in a second direction that is opposite to the first direction, the single multi-turn magnetic sensor can be reset to be empty of domain walls and the index value can be updated accordingly.

APPLICATIONS, TERMINOLOGY, AND CONCLUSION

Multi-turn magnetic sensing systems disclosed herein can be implemented in any suitable application that can benefit from counting turns of a rotating magnetic field. Example applications include, but are not limited to, electronic power steering (EPS) applications such as EPS steer-by-wire actuator applications, parking lock actuators, seat belt retractors, transmission actuators, other vehicular applications, robot and/or cobot applications such as arm joint position tracking, rotary to linear actuator applications, wire drawn encoder applications, other industrial automation applications, and the like.

In the embodiments described above, sensors, circuits, systems, and methods for multi-turn magnetic sensing are described in connection with particular embodiments. It will be understood, however, that the principles and advantages of the embodiments can be used for any other suitable sensors, circuits, systems, and methods with a multi-turn magnetic sensing.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected", as generally used herein, refer to two or more elements that may be either directly connected, or connected by way of one or more intermediate elements. Thus, although the various schematics shown in the figures depict example arrangements of elements and components, additional intervening elements, devices, features, or components may be present in an actual embodiment (assuming that the functionality of the depicted circuits is not adversely affected). Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a measurement error.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states.

The teachings of the embodiments provided herein can be applied to other systems, not necessarily the systems described above. The elements and acts of the various embodiments described above can be combined to provide further embodiments. The acts of the methods discussed herein can be performed in any order as appropriate. Moreover, the acts of the methods discussed herein can be performed serially or in parallel, as appropriate.

While certain embodiments of the inventions have been described, these embodiments have been presented by way of example only, and are not intended to limit the scope of the disclosure. Indeed, the novel circuits, methods, and systems described herein may be embodied in a variety of other forms. Furthermore, various omissions, substitutions and changes in the form of the circuits, methods, apparatus and systems described herein may be made without departing from the spirit of the disclosure. For example, while the disclosed embodiments are presented in given arrangements, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments. The accompanying claims and their equivalents are intended to cover such forms or modifications as would fall within the scope and spirit of the disclosure. Accordingly, the scope of the present inventions is defined by reference to the claims.

Although the claims presented here are in single dependency format for filing at the USPTO, it is to be understood that any claim may depend on any preceding claim of the same type except when that is clearly not technically feasible.

What is claimed is:

1. A multi-turn magnetic sensing system comprising:
   a first multi-turn magnetic sensor;
   a second multi-turn magnetic sensor, wherein domain walls propagate in an opposite direction in the second multi-turn magnetic sensor relative to the first multi-turn magnetic sensor in response to a magnetic field; and
   a decoder configured to output a turn count that is based on output signals from the first multi-turn magnetic sensor and the second multi-turn magnetic sensor, wherein the decoder is configured to determine the turn count for more than one full clockwise rotation of the magnetic field from a reset state and to determine the turn count for more than one full counterclockwise rotation of the magnetic field from the reset state.

2. The multi-turn magnetic sensing system of claim 1, wherein the decoder is configured to determine the turn count in a range from a first value to a second value for states of the first and second multi-turn magnetic sensors relative to the reset state, and wherein the turn count for the reset state is between the first value and the second value.

3. The multi-turn magnetic sensing system of claim 2, wherein the first multi-turn magnetic sensor and the second multi-turn magnetic sensor are each configured to count a same number of turns in opposite directions, and the turn count for the reset state is a midpoint between the first value and the second value.

4. The multi-turn magnetic sensing system of claim 2, wherein the first multi-turn magnetic sensor and the second multi-turn magnetic sensor are each filled with domain walls in the reset state.

5. The multi-turn magnetic sensing system of claim 1, further comprising a magnetic reset configured to magnetically reset the first and second multi-turn magnetic sensors to the reset state, wherein the decoder is configured to determine the turn count in a range from a first value to a second value relative to the reset state, and wherein the turn count for the reset state has a value in between the first value and the second value.

6. The multi-turn magnetic sensing system of claim 5, wherein the magnetic reset comprises a coil configured to apply a reset magnetic field to reset the first and second multi-turn magnetic sensors to the reset state.

7. The multi-turn magnetic sensing system of claim 5, further comprising memory configured to store an index value, wherein the multi-turn magnetic sensing system is configured to update the index value in association with magnetically resetting the first and second multi-turn magnetic sensors, and wherein the decoder is configured to generate the turn count based on the index value and the output signals from the first multi-turn magnetic sensor and the second multi-turn magnetic sensor.

8. The multi-turn magnetic sensing system of claim 1, wherein the multi-turn magnetic sensing system operates in a subset of valid states of the first and second multi-turn magnetic sensors when operating in equilibrium.

9. The multi-turn magnetic sensing system of claim 1, wherein the first and second multi-turn magnetic sensors have a state that corresponds to a same number of turns as the reset state, and the first and second multi-turn magnetic sensors are not configured to move from the state to the reset state by rotation of the magnetic field.

10. The multi-turn magnetic sensing system of claim 1, wherein the turn count has a same value for at least two different of states of the first and second multi-turn magnetic sensors.

11. The multi-turn magnetic sensing system of claim 1, further comprising an angle sensor and processing circuitry configured to output a position measurement, wherein the position measurement is based on the turn count and an angle, and wherein the angle is based on an output signal of the angle sensor.

12. A multi-turn magnetic sensing system with mid-range reset, the multi-turn magnetic sensing system comprising:
    a first multi-turn magnetic sensor;
    a second multi-turn magnetic sensor, wherein domain walls propagate in opposite directions in the second multi-turn magnetic sensor and the first multi-turn magnetic sensor in response to a magnetic field; and
    a decoder configured to output a turn count associated with states of the first multi-turn magnetic sensor and the second multi-turn magnetic sensor, wherein the turn count is in a range from a first value to a second value relative to a reset state, and wherein the turn count for the reset state is between the first value and the second value.

13. The multi-turn magnetic sensing system of claim 12, further comprising a magnetic reset configured to magnetically reset the first and second multi-turn magnetic sensors to the reset state.

14. The multi-turn magnetic sensing system of claim 12, wherein the turn count has a same value for at least two different of states of the first and second multi-turn magnetic sensors.

15. The multi-turn magnetic sensing system of claim 12, wherein the first and second multi-turn magnetic sensors have a state that corresponds to a same number of turns as the reset state, and the first and second multi-turn magnetic sensors are not configured to move from the state to the reset state by rotation of the magnetic field.

16. A method of multi-turn magnetic sensing with mid-range reset, the method comprising:

resetting a first multi-turn sensor and a second multi-turn sensor to a reset state, wherein domain walls propagate in opposite directions in the first multi-turn sensor and the second multi-turn sensor in response to rotation of a magnetic field;

detecting a first non-zero number of turns of the magnetic field from the reset state based on reading out first values from the first multi-turn sensor and the second multi-turn sensor, the first non-zero number of turns representing that a cumulative rotation of the magnetic field is in a clockwise direction from the reset state; and detecting a second non-zero number of turns of the magnetic field relative to the reset state based on reading out second values from the first multi-turn sensor and the second multi-turn sensor, the second non-zero number of turns representing that the cumulative rotation of the magnetic field is in a counter-clockwise direction from the reset state.

17. The method of claim 16, wherein the first multi-turn sensor and the second multi-turn sensor are each comprise magnetic spirals having a same number of turns.

18. The method of claim 16, wherein the first multi-turn sensor and the second multi-turn sensor are each filled with domain walls in the reset state.

19. The method of claim 16, further comprising:

magnetically resetting the first multi-turn sensor in response to the magnetic field rotating a certain number of turns;

updating an index value stored in memory in association with the magnetically resetting; and after the updating and additional rotation of the magnetic field, determining a turn count based on the index value and reading out third values from the first multi-turn sensor and the second multi-turn sensor.

20. The method of claim 16, further comprising generating a position measurement based on a turn count and angle information associated with the magnetic field.

* * * * *